April 1, 1969 W. Y. FALLIN 3,435,632
CONVEYOR-TYPE FREEZER USING CARBON DIOXIDE SNOW
Filed Oct. 4, 1966 Sheet 1 of 2

INVENTOR
Walter Y. Fallin

BY Shlesinger, Arkwright & Garvey
ATTORNEYS

April 1, 1969   W. Y. FALLIN   3,435,632
CONVEYOR-TYPE FREEZER USING CARBON DIOXIDE SNOW
Filed Oct. 4, 1966   Sheet 2 of 2
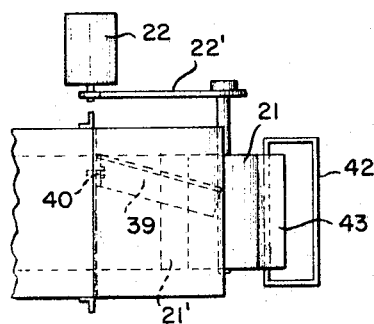
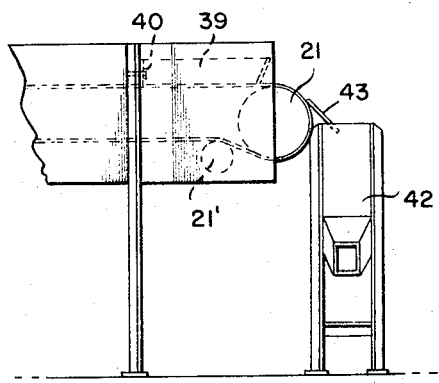
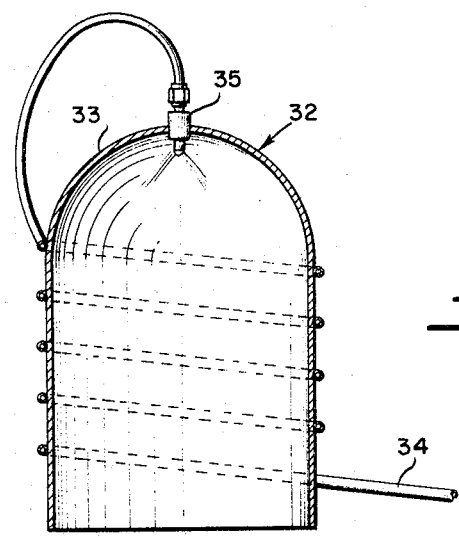
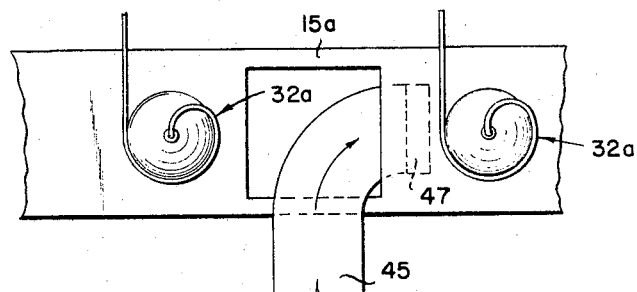
INVENTOR
*Walter Y. Fallin*
BY
ATTORNEYS

United States Patent Office 3,435,632
Patented Apr. 1, 1969

---

3,435,632
CONVEYOR-TYPE FREEZER USING CARBON
DIOXIDE SNOW
Walter Y. Fallin, Jacksonville, Fla., assignor to Instafreeze Corporation, Tustin, Calif., a corporation of Nevada
Filed Oct. 4, 1966, Ser. No. 584,132
Int. Cl. F25d 3/12, 25/04
U.S. Cl. 62—322         5 Claims

ABSTRACT OF THE DISCLOSURE

A method and apparatus for freezing, protecting, and/or treating foods and/or other materials including conveying food or material on an endless conveyor belt to a confined area such as a tunnel, feeding a liquid cryogenic agent of a type which changes to snow upon expansion, through tubing to one or more bell shaped housings, each housing having a wall of cold-conducting material, the tubing also being of cold conducting properties and being coiled about the bell shaped housing to effect precooling of the cryogenic agent which produces more snow upon expansion, feeding the liquid cryogenic agent through a nozzle fixed to the tubing within the upper terminal of the housing to expand the liquid cryogenic agent to produce snow which gravitates downwardly onto the food or material on the conveyor belt to freeze the same, the snow being applied to one or both sides of the food or material, the food or material further being turned subsequent to the application of the snow thereto, if desired, to effect intermingling of the snow and the food or material.

---

This invention relates to a method and apparatus for freezing and protecting foods, environmental treating of metals, plastics and other materials through the use of cryogenic agents in gas, liquid and solid forms.

Various methods and machines have heretofore been employed for freezing foods, which while successful in the freezing of some foods, are unsatisfactory for freezing other foods, particularly wet foods, such as purees, slurries, heavy pastes, etc., due to the inability to freeze the interior of the food product effectively on a continuous operation basis.

It is an object of this invention to provide a method and apparatus for freezing a wide variety of foods, including wet foods, by means of a cryogenic agent which completely and quickly freezes the entire food to which it is applied.

Another object is to provide oxygen protection by eliminating the oxygen content of the product treated, affording protection equivalent to vacuum packing, and additionally giving low temperature protection to the product.

Another object is to utilize this method and apparatus to heat treat metals, plastics and other materials by providing a rapid, economical and continuous cryogenic quenching system.

Another object is to provide apparatus for freezing or treating of foods or material, including conveyor means passing through an insulated tunnel on which the food or material to be frozen or treated is deposited, and means for depositing carbon dioxide in "snow" (solid) form on the food or material, to effect freezing or treating thereof.

A further object of this invention is to provide a "snow" chamber for solidifying liquid carbon dioxide, which is deposited on the food or material to be frozen or treated, the chamber including means for supercooling the liquid carbon dioxide prior to emission into the chamber, resulting in a greater percentage of "snow" produced in the chamber than has heretofore been possible.

A further object is to provide an apparatus of the character described including means for turning the food product or material after the application of the freezing or treating agent thereto, to effect intermingling thereof with the food or material entity.

A further object is to eliminate the need for conventional freezing tunnels by freezing the product to a degree where it may be placed directly in frozen storage.

A still further object of the present invention is to apply a freezing or treating agent to the conveyor means prior to the placement of food or material thereon, to freeze or treat the side of the food or material which engages the conveyor and to subsequently apply the freezing or treating agent to the upper side of the food or material, the application of the freezing or treating agent to the two sides of the food or material occurring substantially simultaneously.

Other objects of the invention will be manifest from the following description thereof, taken in conjunction with the accompanying drawings, wherein:

FIGURE 2 is a fragmentary top plan view showing one end of the apparatus;

FIGURE 4 is a vertical sectional view of a "snow" chamber constructed in accordance with the present invention;

FIGURE 5 is a perspective view of a modified form of the present invention, and

FIGURE 6 is a top plan view of a portion of the apparatus of FIGURE 5 taken at the point of delivery of food or material to the apparatus.

Figure 1:
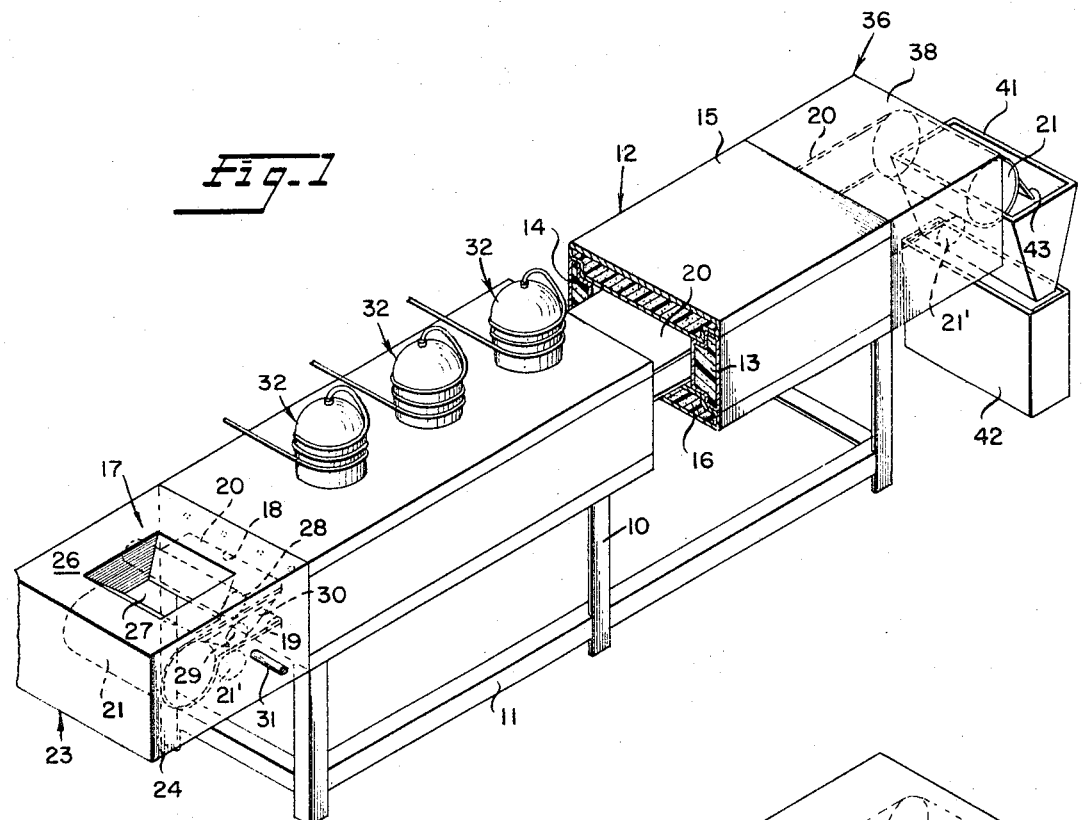
FIGURE 1 is a perspective view of apparatus for freezing or treating foods or materials constructed in accordance with one form of the present invention, a portion thereof being removed to disclose details of construction.
Figure 3:
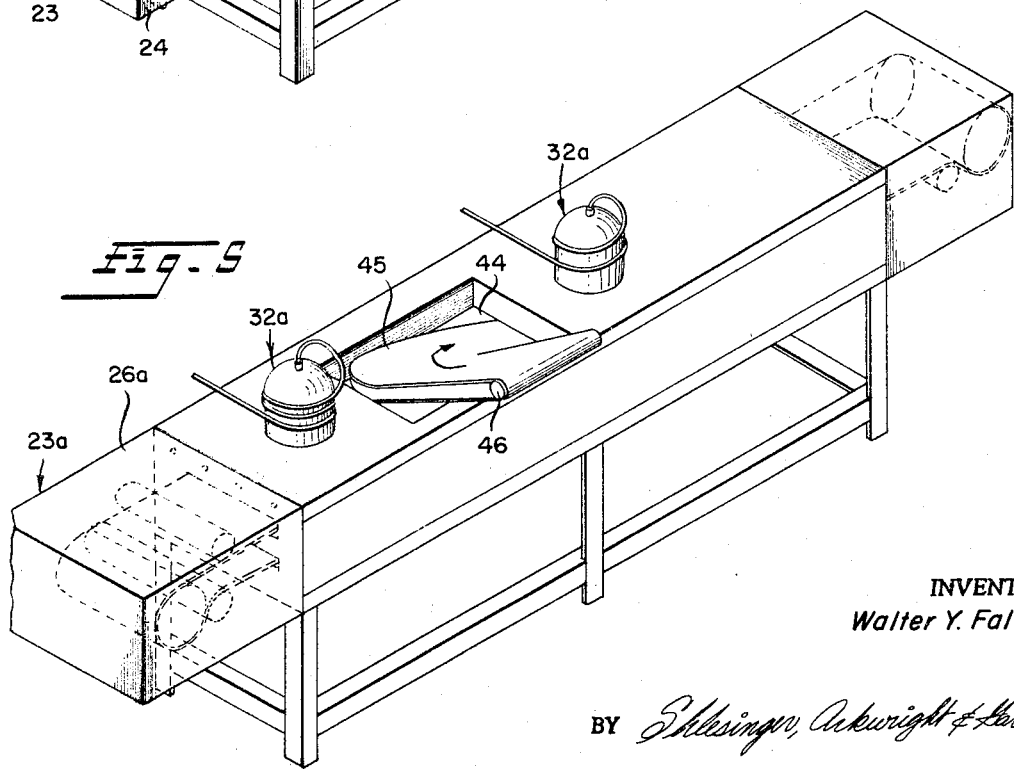
FIGURE 3 is a side elevational view of the portion of the apparatus shown in FIGURE 2.

Referring now in greater detail to the drawings, and more particularly to the form of invention illustrated in FIGURES 1–4, the apparatus of the present invention generally comprises supporting structure including legs 10 and braces 11 on which is mounted an elongated insulated tunnel designated 12. Tunnel 12 includes insulated side portions 13 and 14, a top 15 and a bottom 16, which are adapted to interfit with one another, in the manner illustrated to advantage in FIGURE 1. Tunnel 12 is further provided with end walls 17 having spaced transverse slits 18 and 19, through which the upper and lower runs of an endless conveyor belt 20 are adapted to pass. Belt 20 passes over drums 21, at opposite ends of the tunnel, and idler rollers are indicated at 21'. Drums 21 may be driven by any suitable motive means 22 connected to one of the drums by a belt or the like 22'.

A shroud generally designated 23 is attached to the feed end of tunnel 12 and is adapted to cover that portion of the conveyor extending beyond the tunnel. Shroud 23 includes side walls 24, an end wall 25 and a top 26. A portion of top 26 above conveyor 20 is open and provided with a hopper-like member 27 through which the material to be frozen or treated passes and is deposited on conveyor 20.

Adjacent hopper 27, there are provided a pair of superpositioned rollers 28 and 29 above and below the upper run of conveyor belt 20 for expressing liquid from the food or material to be frozen or treated and for limiting the thickness of the food product or material which passes into tunnel 12. A trough 30 extends beyond the lateral limits of conveyor belt 20, between the upper and lower runs thereof, to catch the liquid as it rolls off belt 20. A liquid recovery pipe is attached to the bottom of the trough, as indicated at 31.

It is a salient part fo the present invention to provide a plurality of "snow" chambers 32 which are preferably mounted in spaced relation in top 15 of tunnel 12 for delivering the freezing or treating agent to the tunnel. "Snow" chambers 32 are of identical construction, one of which is shown in detail in FIGURE 4.

As shown in FIGURE 4, each "snow" chamber includes a bell-shaped housing 33 of stainless steel or other material having cold-conducting characteristics. In accordance with the present invention tubing 34, also of cold-conducting material, is wound about the outer periphery of bell-shaped housing 33 and is in contiguous engagement therewith. A terminal of tubing 34 is connected to a spray nozzle 35 which extends into the upper extremity of the housing. The opposite end of tubing 34 is connected to a source of a cryogenic agent. It has been found that optimum results are obtained by using carbon dioxide as the cryogenic agent, the carbon dioxide being fed in liquid form through tubing 34. As the liquid carbon dioxide passes through the coiled portion around bell-shaped housing 33, it is progressively cooled by the engagement of the tubing with the housing wall. Therefore, when the carbon dioxide passes through nozzle 35, it changes into solid or "snow" form which gravitates downwardly through the interior of housing 33 onto the food or material being passed through the tunnel 12 on conveyor 20. The "snow" also cools housing wall 33 and the cold produced thereby is conducted to tubing 34 and thence to the liquid carbon dioxide being fed therethrough to the "snow" chamber. In this manner, it has been found that approximately 65% or more of the liquid carbon dioxide will be solidified into "snow" form by following this procedure.

After the food or material on the conveyor belt passes beneath the plurality of "snow" chambers 32, it is passed out of tunnel 12 at which point it is within a second shroud 36 having end walls 37 and a top wall 38. Shroud 36 is detachably connected to the delivery end of tunnel 12. Within the confines of shroud 36, there is provided a plow or blade 39 which is fixedly secured at 40 to a stationary part of the present apparatus for intermixing the material being frozen. Supersonic or any other electronic means may also be employed for this purpose. As shown to advantage in FIGURES 2 and 3, plow 39 extetnds angularly across conveyor belt 20 in the path of the frozen or treated food or material which has just been conveyed from tunnel 12. Plow 39 engages the food or material and turns it over to intermingle the food or material with the freezing or treating agent, thereby assuring the complete freezing or treating of all parts of the food or material. Beyond drum 22 there is provided a hopper 41 into which the frozen or treated material or food is dumped for packaging in a container 42. A scraper 43 carried by the hopper, which is tapered and turned at one end, engages conveyor belt 20 at drum 21, to remove the frozen or treated food or material which may adhere to the conveyor belt.

OPERATION

In use of the present invention in freezing orange fruit cells, for example, the mass of fruit cells is dumped into hopper 27 where it gravitates onto conveyor belt 20. The squeezing action of rollers 28 and 29 removes excess liquid from the fruit cells, which liquid falls into trough 30 for recovery through pipe 31. Rollers 28 and 29 further spread the mass of fruit cells in a layer of predetermined thickness on the conveyor belt, preferably not in excess of 1 inch, to insure complete freezing of the fruit cells throughout. As the fruit cells pass beneath "snow" chambers 32, the "snow" produced by the solidified carbon dioxide is deposited on the orange fruit cells to effect instantaneous freezing of the fruit cells. It has been found that orange fruit cells may be economically and satisfactorily frozen by the use of one pound of carbon dioxide to three pounds of orange fruit cells. The carbon dioxide not only freezes the orange fruit cells but also gasifies the atmosphere around the same, displacing oxygen and inhibiting the growth of micro-organisms (yeast mold and bacteria) that would cause spoilage and chemical changes.

As the orange fruit cells pass out of tunnel 12, they are engaged by plow 39 which turns the mass of fruit cells over and breaks up the mass so that the carbon dioxide snow is intermingled with the same, to effect thorough freezing of the orange fruit cells. The fruit cells are then dropped through hopper 22 into carton 42, which is then closed or sealed and transported directly to cold storage for future use without the need for passing through a conventional freeze tunnel.

By incorporating a measured amount of carbon dioxide into the fruit cells as it is packaged, the temperature of the mass is reduced to freezing within a few minutes. As above indicated, oxidation of the product is eliminated so that the product retains its fresh flavor and can be stored for a long period of time without loss of quality.

EXAMPLE OF ACTUAL CONTINUOUS PROCESS RUN

Description

Orange fruit cells coming from the juice extraction operation were fed into an apparatus of the type described and processed according to the method described and packed in 48 lb. net weight containers and placed directly in $-10°$ F. storage.

Data

Season totals:
  Operating season _____days__ 83
  Actual production _____do____ 69
  Orange fruit cells processed _____lbs__ 2,025,306
  Machine operation _____hours__ 830
  Machine down time _____do____ 4
  Carbon dioxide consumed _____lbs__ 672,859
  Fruit cells lost due to spoilage in storage _ None Operation generally was a 2 shift, 12 hours/shift operation with a clean-up of 2 hours per day for sterilization and the down time reflects that time when the machine was out of service due to mechanical failure when fruit cells were available.

Maximum operating day totals:
  Orange fruit cells processed _____lbs__ 60,240
  Machine operation _____hours__ 22
  Machine down time _____ None
  Carbon dioxide consumed _____lbs__ 19,801
  Fruit cells lost due to spoilage in storage ____ None

RESULTS

| | Lbs. per hr. of orange fruit cells processed | Machine efficiency, percent | Lbs. of fruit cells per lb. of liquid $CO_2$ used | Lbs. of fruit cells lost in storage due to spoilage |
|---|---|---|---|---|
| Season average_ | 2,426 | 99.52 | 3.01 | 0 |
| Maximum day__ | 2,738 | 100 | 3.07 | 0 |

Six commercial packages from the production line were stored alongside of six commercial packages that had been run 37 days prior and stored at $-10°$ F. These packages, stored side-by-side, were in a cooler warehouse set for a minimum temperature of $34°$ F. (actual average temperature was $38°$ F.–$40°$ F.). When opened and compared 46 days later, the "production" product showed 6 small white mold colonies on the top surface and the "frozen storage" product showed 10 pink mold colonies on the surface. The inside contents of both were clean of visible micro-organism growth, the odor was clean with no fermentation noted. Surface colonies of micro-organisms were due to the fact that the polyethylene storage bags were only folded and not sealed in this test, allowing air passage and airborne organisms to reach the surface of the product. The evidence indicates a high degree of preservation attained by this process.

In accordance with the method and apparatus of the present invention, blanching of most fresh fruits and vegetables is unnecessary. The food product is introduced into a —40° F. or lower, gas oxygen-free environment. This instantaneously kills many bacteriological and micro-bacteriological organisms. It also reduces to a minimum enzyme activity, as well as hibernating the micro-bacteriological organisms that are not killed.

Oxygen protection is afforded by lowering the oxygen level inside the insulated tunnel to less than 1% (.01% to 1%) which is less than 7.6 mm. of mercury partial pressure, and is equivalent to vacuum packing at 26 inches to 27 inches of mercury. Oxygen protection in the finished product package is obtained in the range of 1% to 10% oxygen, with its preferred level 4%.

The temperature of carbon dioxide "snow" deposited on the food or material to be frozen is approximately —109° F., and the design of the present apparatus is such that its controls and balances (material and thermodynamic) permits continuous twenty-four hour operation a day. The "snow" chamber of the present invention has been found to produce up to 50% more "snow" (solid carbon dioxide). The additional "snow" results in lowered tunnel temperature per unit weight of carbon dioxide utilized, thereby producing greater heat absorption capacity and reduced costs.

EMODIMENT OF FIGURES 5 AND 6

In FIGURES 5 and 6 there are illustrated a modified form of the present invention which is particularly adapted for applying carbon dioxide "snow" or other cryogenic agent to both sides of the food or material being frozen or treated substantially simultaneously. This form of the invention is particularly adapted for freezing or treating foods or materials which, due to their nature, could not be frozen with the apparatus shown in FIGURES 1–4. This includes such products as sliced tomatoes, sliced peaches, melons, etc.

In this form of the invention, there is a basic similarity between the parts therein employed and those comprising the apparatus of FIGURES 1–4. Accordingly, like portions are identified by like numbers followed by the letter $a$. It will be noted that in this form of the invention the food or material to be frozen or treated is not fed from the end of tunnel 12a and accordingly, top 26a of shroud 23a is imperforate.

It will be noted from a consideration of FIGURE 5, that "snow" chambers 32a are in substantially spaced relationship to each other and that the portion of top 15a lying therebetween is provided with an opening 44. In accordance with this form of the invention, an angular auxiliary conveyor belt 45, of any suitable construction, extending between drums 46 and 47 passes through the opening to deliver the food or material to be frozen or treated to conveyor belt 20a. For this purpose the upper portion of conveyor 45 extends beyond the upper limit of tunnel 12a and laterally thereof, to facilitate the placement of food products or other material thereon. The lower portion of conveyor 45 lies superjacent conveyor belt 20a, at a point proximate "snow" chamber 32a, as shown in FIGURE 6.

In the modified form of the present invention, "snow" chambers 32a function in the same manner as described above in connection with the form of the invention illustrated in FIGURES 1–4. Carbon dioxide "snow" is generated within chamber 32a adjacent one end of the tunnel, the "snow" being deposited on conveyor belt 20a. The food or material to be frozen or treated is placed on auxiliary belt 45 and is directed downwardly through opening 44 and deposited on conveyor belt 20a which has a layer of carbon dioxide "snow" thereon as a result of passing beneath the first "snow" chamber 32a. Immediately after, the food or material is deposited on conveyor belt 20a, and the freezing or treating effect of the carbon dioxide "snow" applied to the underface of the food material. Approximately simultaneously, the carbon dioxide "snow" generated by the second "snow" chamber 32a is deposited on the upper surface of the food or material so that instantaneous freezing or treating of the food or material is effected by application of the freezing or treating agent to the upper and lower surfaces thereof in rapid succession. The frozen or treated food or material is conveyed through the remainder of tunnel 12a and at the end thereof is removed and placed in any suitable container for storage.

With the method and apparatus of the present invention, a rapid and economic means is provided for instantly freezing or treating food products or other material, particularly those which have been heretofore difficult to effectively freeze or treat without spoilage, the present method and apparatus effecting immediate freezing or treating of the food or other material to obviate spoilage (both chemical and bacteriological) caused by incomplete freezing or treating, or slow heat removal by other methods. In addition the removal of oxygen from the final product provides additional "shelf life" to the finished product.

The method and apparatus of the present invention may also be employed to quick-freeze seafood, meats and other quick spoilage food, and the apparatus may readily be mobilized for use in the field, as well as on ships at sea. This method and apparatus also functions to pre-cool fresh fruits and vegetables, removing only "field heat" and reducing secondary infection inhibiting enzymatic action, killing or inhibiting further growth of micro-organisms by the removal of oxygen.

While there has been herein shown and described the presently preferred forms of the present invention, it is to be understood that such has been done for purposes of illustration only, and that various changes may be made within the scope of the claims hereto appended.

What I claim is:
1. Apparatus for freezing or treating food products or materials including:
   (a) an elongated, insulated tunnel,
   (b) an endless conveyor belt passing longitudinally through said tunnel,
   (c) a plurality of "snow" chambers mounted on said tunnel above said endless conveyor belt,
   (d) each of said "snow" chambers including a bell shaped housing having a cold-conducting wall,
   (e) a cold-conducting coiled tube wound around said bell shaped housing,
   (f) a nozzle connected to one terminal of said coiled tube and extending through the bell shaped housing wall near the upper terminal thereof,
   (g) fluid carbon dioxide fed into said coiled tube and progressively cooled during passage therethrough by the cold conducted by the housing wall,
   (h) said carbon dioxide being emitted from said nozzle in "snow" and vapor form for deposit on the food or material to be frozen or treated and to cool the housing wall.
2. The apparatus of claim 1, with the addition of:
   (a) a stationary plow mounted in the path of the food or material to which snow has been applied, for turning the food or material and effecting intermingling of the snow and food or material.
3. The apparatus of claim 1, with the addition of:
   (a) auxiliary conveyor means for delivering food or material to said endless conveyor,
   (b) said auxiliary conveyor means depositing the food or material on the endless conveyor at a point intermediate adjacent snow chambers.
4. The apparatus of claim 1, with the addition of:
   (a) means for expressing liquid from the food or material prior to the application of snow thereto.

5. Apparatus for freezing or treating food products including:
(a) an insulated tunnel,
(b) an endless conveyor extending longitudinally through said tunnel,
(c) snow chambers mounted in said tunnel above said endless conveyor,
(d) each of said snow chambers comprising a bell shaped housing,
(e) tubular means for feeding a liquid cryogenic agent which changes to snow upon expansion, to the snow chambers,
(f) said tubular means being coiled about, and in thermal contact with said bell shaped housing, for substantially pre-cooling the cryogenic agent while being fed to the snow chambers, and
(g) expanding means comprising an expansion nozzle connected to a terminal of the tube means and extending into the upper portion of the housing.

References Cited

UNITED STATES PATENTS

| | | | |
|---|---|---|---|
| 1,546,682 | 7/1925 | Slate | 62—10 |
| 1,818,816 | 8/1931 | Rufener et al. | 62—10 |
| 3,310,958 | 3/1967 | Stiller | 165—156 X |
| 3,115,756 | 12/1963 | Overbye | 62—380 X |
| 3,213,634 | 10/1965 | Granata | 62—63 |
| 3,214,928 | 11/1965 | Oberdorfer | 62—63 |
| 3,250,630 | 5/1966 | Webster et al. | 99—193 |
| 3,254,506 | 6/1966 | Braeking | 62—380 X |
| 3,292,384 | 12/1966 | Rubin | 62—63 |
| 3,304,732 | 2/1966 | Rubin | 62—63 |
| 3,315,480 | 4/1967 | Rich | 62—63 |

ROBERT A. O'LEARY, *Primary Examiner.*

WILLIAM E. WAYNER, *Assistant Examiner.*

U.S. Cl. X.R.

62—10, 380, 384